US012694884B2

(12) United States Patent
Clark

(10) Patent No.: US 12,694,884 B2
(45) Date of Patent: Jul. 28, 2026

(54) VOICING SMOOTHER

(71) Applicant: Digital Voice Systems, Inc., Westford, MA (US)

(72) Inventor: Thomas Clark, Westford, MA (US)

(73) Assignee: Digital Voice Systems, Inc., Westford, MA (US)

( * ) Notice: Subject to any disclaimer, the term of this patent is extended or adjusted under 35 U.S.C. 154(b) by 273 days.

(21) Appl. No.: 18/645,104

(22) Filed: Apr. 24, 2024

(65) Prior Publication Data

US 2025/0336405 A1 Oct. 30, 2025

(51) Int. Cl.
*G10L 19/16* (2013.01)
*G10L 19/087* (2013.01)

(52) U.S. Cl.
CPC .......... *G10L 19/173* (2013.01); *G10L 19/087* (2013.01)

(58) Field of Classification Search
CPC ... G10L 19/173; G10L 19/087; G10L 19/005; G10L 25/93
See application file for complete search history.

(56) References Cited

U.S. PATENT DOCUMENTS 3,622,704 A 11/1971 Ferrieu et al.
3,903,366 A 9/1975 Coulter
4,630,304 A 12/1986 Borth et al.
4,710,960 A * 12/1987 Sato .......................... H04B 1/66 704/219
4,847,905 A 7/1989 Lefevre et al.
4,932,061 A 6/1990 Kroon et al.
4,944,013 A 7/1990 Gouvianakis et al.
5,081,681 A 1/1992 Hardwick et al.
5,086,475 A 2/1992 Kutaragi et al.
5,193,140 A 3/1993 Minde
5,195,166 A 3/1993 Hardwick et al.
(Continued)

FOREIGN PATENT DOCUMENTS

EP 0893791 1/1999
EP 1020848 7/2000
(Continued)

OTHER PUBLICATIONS

U.S. Appl. No. 17/387,412, filed Jul. 28, 2021, Hardwick.
(Continued)

*Primary Examiner* — Anne L Thomas-Homescu
(74) *Attorney, Agent, or Firm* — Fish & Richardson P.C.

(57) ABSTRACT

This disclosure provides a method of correcting errors in a digital speech signal, a speech decoder, a handset or mobile radio, and a base station or console. The method includes receiving a voice bit stream including voicing bits of a current frame, voicing bits of a prior frame, and a voicing confidence measure for the current frame; generating a set of common voicing patterns for the current frame; resampling voicing bands of the prior frame, so that the number of voicing bands in the resampled prior frame is the same as the number of voicing bands in the current frame; determining a distance for each of the set of common voicing patterns with respect to the current frame and the prior frame; and replacing the current frame with a particular voicing pattern in the set of common voicing patterns, wherein the particular voicing pattern has the minimum distance.

20 Claims, 4 Drawing Sheets

(56) References Cited

U.S. PATENT DOCUMENTS 5,216,747 A 6/1993 Hardwick et al.
5,226,084 A 7/1993 Hardwick et al.
5,226,108 A 7/1993 Hardwick et al.
5,247,579 A 9/1993 Hardwick et al.
5,305,332 A * 4/1994 Ozawa .................... H04B 1/66 704/223
5,351,338 A 9/1994 Wigren
5,491,772 A 2/1996 Hardwick et al.
5,517,511 A 5/1996 Hardwick et al.
5,581,656 A 12/1996 Hardwick et al.
5,630,011 A 5/1997 Lim et al.
5,649,050 A 7/1997 Hardwick et al.
5,657,168 A 8/1997 Maruyama et al.
5,664,051 A 9/1997 Hardwick et al.
5,664,052 A 9/1997 Nishiguchi et al.
5,696,874 A 12/1997 Taguchi
5,701,390 A 12/1997 Griffin et al.
5,715,365 A 2/1998 Griffin et al.
5,742,930 A 4/1998 Howitt
5,754,974 A 5/1998 Griffin et al.
5,826,222 A 10/1998 Griffin
5,870,405 A 2/1999 Hardwick et al.
5,937,376 A 8/1999 Minde
5,963,896 A 10/1999 Ozawa
5,983,174 A * 11/1999 Wong .................... H03M 13/41 704/226
6,018,706 A 1/2000 Huang et al.
6,064,955 A 5/2000 Huang et al.
6,131,084 A 10/2000 Hardwick
6,161,089 A 12/2000 Hardwick
6,199,067 B1 3/2001 Geller
6,377,916 B1 4/2002 Hardwick
6,484,139 B2 11/2002 Yajima
6,502,069 B1 12/2002 Grill et al.
6,526,376 B1 2/2003 Villette et al.
6,574,334 B1 6/2003 Bartkowiak
6,574,593 B1 6/2003 Gao et al.
6,675,148 B2 1/2004 Hardwick
6,691,084 B2 2/2004 Manjunath et al.
6,760,699 B1 7/2004 Weerackody et al.
6,895,373 B2 5/2005 Garcia et al.
6,912,495 B2 6/2005 Griffin et al.
6,931,373 B1 8/2005 Bhaskar et al.
6,954,726 B2 10/2005 Brandel et al.
6,963,833 B1 11/2005 Singhal
6,968,309 B1 * 11/2005 Makinen ............... G10L 19/005 704/223
7,016,831 B2 3/2006 Suzuki et al.
7,171,156 B2 1/2007 Caffrey et al.
7,272,556 B1 * 9/2007 Aguilar ................. G10L 19/002 704/226
7,289,952 B2 10/2007 Yasunaga et al.
7,310,596 B2 12/2007 Ota et al.
7,394,833 B2 7/2008 Heikkinen et al.
7,421,388 B2 9/2008 Zinser et al.
7,430,507 B2 9/2008 Zinser, Jr. et al.
7,519,530 B2 4/2009 Kaajas et al.
7,529,660 B2 5/2009 Bessette et al.
7,529,662 B2 5/2009 Zinser, Jr. et al.
7,634,399 B2 12/2009 Hardwick
7,957,963 B2 6/2011 Hardwick
7,970,606 B2 6/2011 Hardwick
8,050,397 B1 11/2011 Read
8,200,497 B2 6/2012 Hardwick
8,315,860 B2 11/2012 Hardwick
8,340,973 B2 12/2012 Tsuchinaga et al.
8,359,197 B2 1/2013 Hardwick
8,595,002 B2 11/2013 Hardwick
9,232,376 B2 1/2016 Senese et al.
11,270,714 B2 * 3/2022 Clark ...................... G10L 19/12
11,715,477 B1 * 8/2023 Griffin .................. G10L 19/038 704/500
11,990,144 B2 * 5/2024 Hardwick ............ G10L 19/005
12,462,814 B2 * 11/2025 Clark .................... G10L 19/005
2003/0135374 A1 7/2003 Hardwick
2003/0154073 A1 8/2003 Ota et al.
2004/0002856 A1 1/2004 Bhaskar et al.
2004/0093206 A1 5/2004 Hardwick
2004/0117178 A1 6/2004 Ozawa
2004/0153316 A1 8/2004 Hardwick
2004/0174984 A1 9/2004 Jabri et al.
2004/0253925 A1 12/2004 Caffrey et al.
2004/0260544 A1 12/2004 Kikumoto
2005/0278169 A1 12/2005 Hardwick
2005/0281289 A1 12/2005 Huang et al.
2010/0086140 A1 4/2010 Chen et al.
2010/0088089 A1 4/2010 Hardwick
2010/0094620 A1 4/2010 Hardwick
2011/0077940 A1 * 3/2011 Vos ....................... G10L 19/005 704/229
2011/0208514 A1 8/2011 Tsuchinaga et al.
2011/0257965 A1 10/2011 Hardwick
2012/0266042 A1 * 10/2012 Shen ................ H03M 13/6356 714/755
2013/0144613 A1 6/2013 Hardwick
2014/0029733 A1 1/2014 Smith et al.
2014/0236587 A1 8/2014 Subasingha et al.
2016/0371028 A1 * 12/2016 Berman .................. G06F 12/00
2017/0325049 A1 11/2017 Basu Mallick et al.
2018/0358023 A1 * 12/2018 Sasaki ..................... G10L 19/24
2021/0210106 A1 * 7/2021 Clark .................... G10L 19/087
2021/0366498 A1 11/2021 Tomasek et al.
2023/0043682 A1 2/2023 Hardwick
2023/0144613 A1 5/2023 Mauch et al.
2023/0326473 A1 10/2023 Clark et al.
2024/0420707 A1 * 12/2024 Hassan ................... G10L 25/60
2025/0118309 A1 * 4/2025 Clark .................... G10L 19/005

FOREIGN PATENT DOCUMENTS

EP 1237284 9/2002
JP H05346797 12/1993
JP H10293600 11/1998
WO WO 1998004046 1/1998
WO WO 2007042350 4/2007

OTHER PUBLICATIONS

U.S. Appl. No. 18/482,350, filed Oct. 6, 2023, Hardwick.
[No Author Listed], "Project 25 Vocoder Description," TIA Standard, Feb. 2014, 162 pages.
International Search Report and Written Opinion in International Appln. No. PCT/US2021/012608, mailed on Mar. 31, 2021, 9 pages.
International Search Report and Written Opinion in International Appln. No. PCT/US2022/074176, mailed on Nov. 18, 2022, 11 pages.
International Search Report and Written Opinion in International Appln. No. PCT/US2023/017748, mailed on May 5, 2023, 6 pages.
International Search Report and Written Opinion in International Appln. No. PCT/US23/17755, mailed on Jul. 18, 2023, 12 pages.
Mears, "High-speed error correcting encoder/decoder," IBM Technical Disclosure Bulletin USA, Oct. 1980, 23(4):2135-2136.
Shoham, "High-quality speech coding at 2.4 to 4.0 kbps based on time-frequency interpolation," Presented at the Proceedings of the IEEE International Conference on Acoustics, Speech, and Signal Processing, Minneapolis, MN, USA, Apr. 27-30, 1993, 2:167-170.
International Search Report and Written Opinion in International Appln. No. PCT/US2024/049998, mailed on Dec. 6, 2024, 8 pages.

* cited by examiner

VOICING SMOOTHER

TECHNICAL FIELD

This disclosure relates generally to a vocoder including a voicing smoother.

BACKGROUND

Modern voice communications, such as mobile radio and cellular telephony, transmit voice as digital data, and in many cases where transmission bandwidth is limited, the voice data is compressed by a vocoder to reduce the data that must be transmitted. Similarly, voice recording and storage applications may also use digital voice data with a vocoder to reduce the amount of data that must be stored per unit time.

Vocoders are employed by digital mobile radio systems including Project 25 (P25), Digital Private Mobile Radio (dPMR), Digital Mobile Radio (DMR), and Terrestrial Trunked Radio (TETRA), where a low bit rate vocoder, typically operating between 2-5 kbps, is used. For example, in P25 radio systems, a dual-rate vocoder operating at 2450 or 4400 bps (not including error control bits) is used, while in DMR radio systems, the vocoder operates at 2450 bps. In these and other radio systems, the vocoder is based on the Multiband Excitation (MBE) speech model, and variants include the Improved Multiband Excitation (IMBE™), Advanced Multiband Excitation (AMBE®), and AMBE+2™ vocoders. Telecommunications Industry Association (TIA) standard document 102BABA including the Half Rate Vocoder Annex describes a dual rate vocoder used in P25. While newer versions of this vocoder containing various additional features and enhancements have been developed and are in use in newer radio equipment, the IMBE™ vocoder described in TIA 102BABA is illustrative of the type of vocoder used in the systems described below. Other details of MBE vocoders are discussed in U.S. Pat. No. 7,970,606 ("Interoperable Vocoder") and U.S. Pat. No. 8,359,197 ("Half-rate Vocoder"), both of which are incorporated herein by reference.

A vocoder is divided into two primary functions: (i) an encoder that converts an input sequence of voice samples into a low-rate voice bit stream; and (ii) a decoder that reverses the encoding process and converts the low-rate voice bit stream back into a sequence of voice samples that are suitable for playback via a digital-to-analog converter and a loudspeaker.

SUMMARY

Techniques are provided for detecting and correcting voicing errors that forward error correction fails to correct in a digital speech or a voice bit stream of, for example, a P25, DMR, dPMR, Next Generation Digital Narrowband (NXDN™), Mototrbo™, or other digital mobile radio systems. The techniques provide a voicing smoother that significantly improves voice quality improvements with little computational complexity.

In one general aspect, correcting errors in a digital speech signal includes receiving a voice bit stream and from it voicing bits of a current frame, voicing bits of a prior frame, and a voicing confidence measure for the current frame. A determination is made as to whether the voicing confidence measure is less than a first threshold. In response to determining that the voicing confidence measure is less than the first threshold, a set of common voicing patterns is generated, and a determination is made as to whether the current frame matches a voicing pattern in the set of common voicing patterns. In response to the current frame failing to match any voicing pattern in the set of common voicing patterns, voicing bands of the prior frame are resampled so that a number of voicing bands in the resampled prior frame is the same as a number of voicing bands in the current frame. Then a distance is determined for each of the set of common voicing patterns with respect to the current frame and the prior frame, and the current frame is replaced with a particular voicing pattern in the set of common voicing patterns that has a smallest determined distance.

Implementations may include one or more of the following features. For example, in some implementations, in response to the current frame matching a voicing pattern in the set of common voicing patterns, a determination is made as to whether the voicing confidence measure is less than a second threshold that is less than the first threshold.

The set of common voicing patterns may include $\{c_0, \ldots, c_{\tilde{K}}\}$, $$c_i = \sum_{k=1}^{i+1} 2^{\tilde{K}-k} \quad 0 \le i < \tilde{K}$$

$$c_{\tilde{K}} = 0,$$

where $\tilde{K}$ is the number of voicing bands in the current frame. The number of voicing patterns in the set of common voicing patterns may be $\tilde{K}+1$. The set of common voicing patterns may be a subset of $2^{\tilde{K}}$ possible voicing patterns.

Resampling the voicing bands of the prior frame may further include generating a voicing decision for each voicing harmonic of the prior frame; resampling voicing harmonics of the prior frame, so that a number of voicing harmonics in the prior frame is the same as a number of voicing harmonics in the current frame; and converting the voicing decision for each voicing harmonic of the prior frame to a voicing decision for each voicing band of the prior frame.

The distance may be a hamming distance, and the hamming distance may be a weighted combination of a first hamming distance between each voicing pattern in the set of common voicing patterns and the prior frame and a second hamming distance between each voicing pattern in the set of common voicing patterns and the current frame.

The voice bit stream may be generated by an MBE encoder.

In another general aspect, a speech decoder is configured to receive a voice bit stream; generate, from the received voice bit stream, voicing bits of a current frame, voicing bits of a prior frame, and a voicing confidence measure for the current frame; and determine whether the voicing confidence measure is less than a first threshold. In response to determining that the voicing confidence measure is less than the first threshold, the speech decoder generates a set of common voicing patterns. The speech decoder determines whether the current frame matches a voicing pattern in the set of common voicing patterns. In response to the current frame failing to match any voicing pattern in the set of common voicing patterns, the speech decoder resamples voicing bands of the prior frame, so that a number of voicing bands in the resampled prior frame is the same as a number of voicing bands in the current frame, determines a distance for each of the set of common voicing patterns with respect to the current frame and the prior frame, and replaces the current frame with a particular voicing pattern in the set of common voicing patterns that has a smallest determined distance.

Implementations may include one or more of the features discussed above.

The techniques for detecting and correcting voicing errors discussed above and described in more detail below may be implemented by a speech decoder such as multiband excitation (MBE) decoder. The speech decoder may be included in, for example, a handset, a mobile radio, a base station, or a console.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

The described techniques provide a vocoder, such as an AMBE® or MBE vocoder, that includes a voicing smoother for detecting and correcting voicing errors that forward error correction fails to correct in a digital speech or voice bit stream. The voicing smoother takes as inputs error-corrected voicing bits of a current frame $\tilde{b}_1$, error-corrected voicing bits of a prior frame $$\tilde{b}_1^{(-1)},$$

error-corrected fundamental frequency bits $\tilde{b}_0$, voicing confidence measure $C_4$ for the current frame, and voicing confidence measure $$C_4^{(-1)}$$

for the prior frame, and outputs a "smoothed" variant of $\tilde{b}_1$, which eliminates or reduces voicing artifacts that negatively affect voice quality and/or intelligibility.

The voicing smoother generates a set of "common" voicing patterns for each frame. The set of "common" voicing patterns is dependent upon the number of voicing bands in the frame. If the voicing confidence measure is less than a predetermined threshold and the voicing bits for the current frame do not match any member of the "common" voicing patterns, the voicing smoother replaces the voicing bits for the current frame with a member of the set of "common" voicing patterns that most closely matches the voicing bits for the current frame. If the voicing confidence measure is more than a predetermined threshold, the voicing smoother does not modify the voicing bits.

Figure 1:
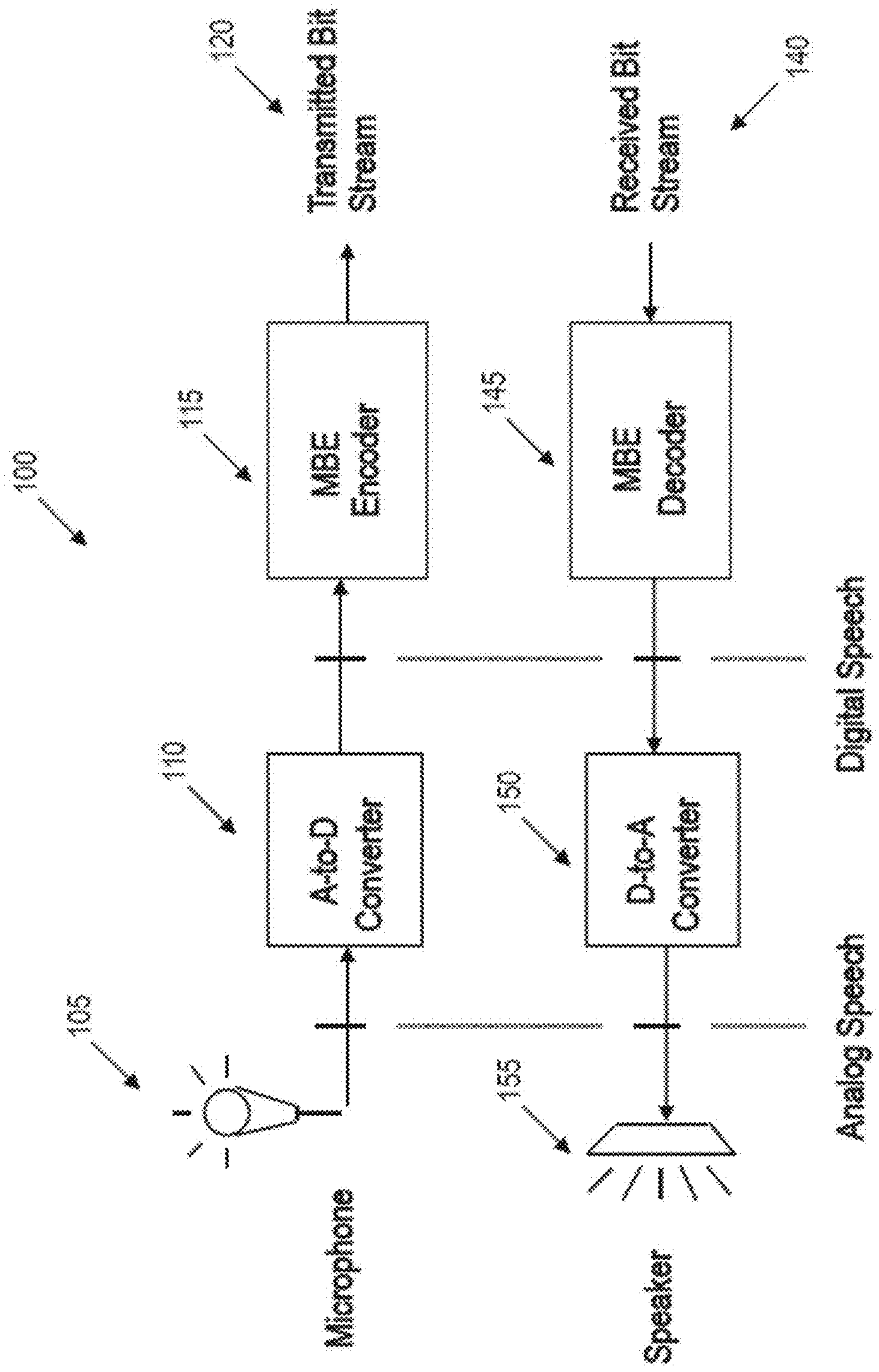
FIG. 1 is a block diagram of a vocoder.

FIG. 1 shows a speech coder or vocoder system 100 that samples analog speech from a microphone 105. An analog-to-digital ("A-to-D") converter 110 digitizes the sampled speech to produce a digital speech signal. The digital speech is processed by an MBE speech encoder 115, including an FEC encoder, to produce a digital bit stream 120 suitable for transmission or storage. The speech encoder 115 processes the digital speech signal in short frames. Each frame of digital speech samples produces a corresponding frame of bits in the bit stream output of the encoder.

FIG. 1 also depicts a received bit stream 140 entering an MBE speech decoder 145 that includes an FEC decoder and processes each frame of bits to produce a corresponding frame of synthesized speech samples. A digital-to-analog ("D-to-A") converter 150 then converts the digital speech samples to an analog signal that can be passed to a speaker 155 for conversion into an acoustic signal suitable for human listening.

Figure 2:
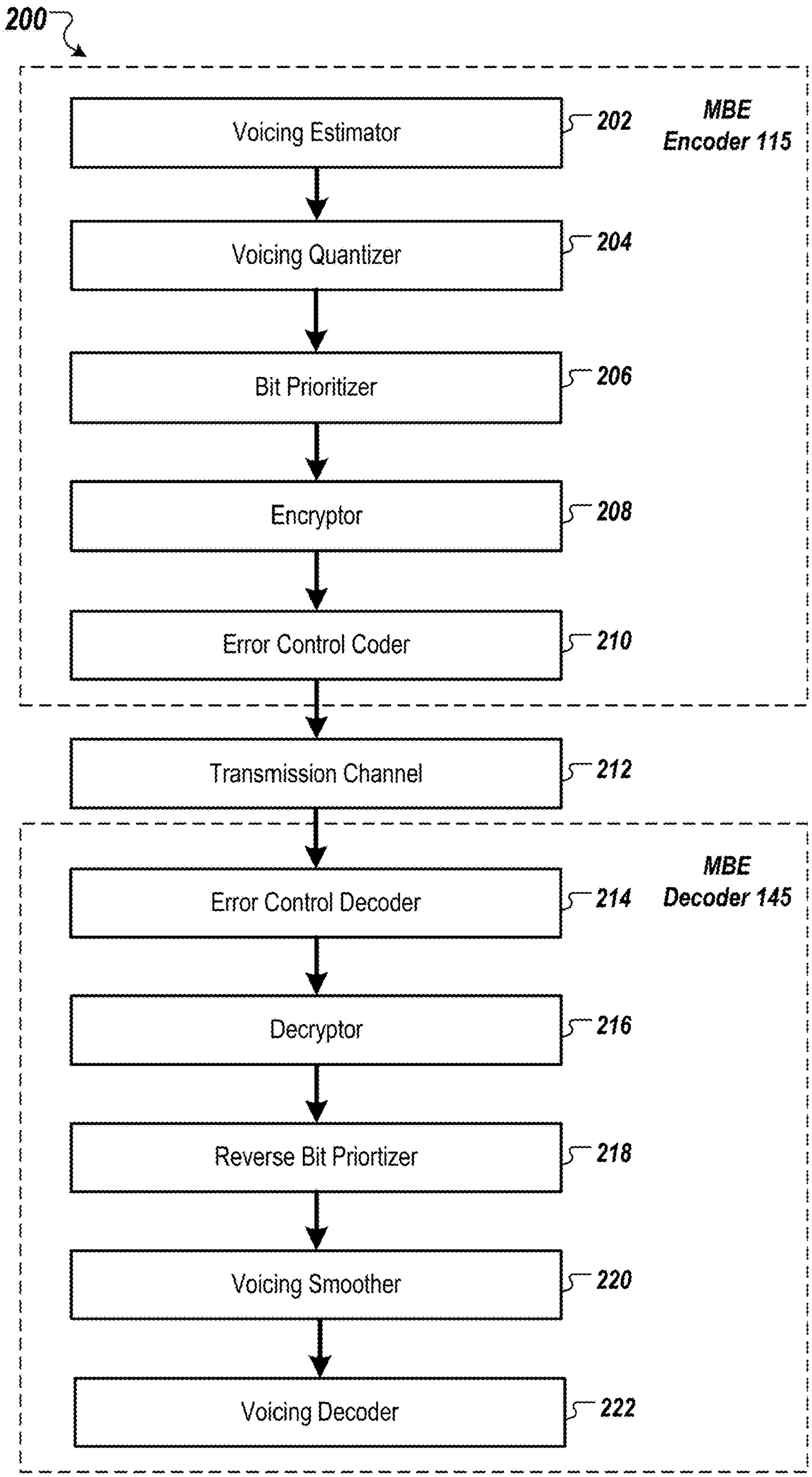
FIG. 2 is a flow chart of an encoding and decoding process.

Referring to FIG. 2, an encoder (e.g., MBE encoder 115 of FIG. 1) and a decoder (e.g., MBE speech decoder 145) operate according to a process 200. The process 200 shows how voicing bands are estimated, quantized, and decoded. Details of MBE encoder 115 (e.g., a P25 encoder) and MBE speech decoder 145 (e.g., a P25 decoder) are discussed in Project 25 Vocoder Description TIA-102.BABA-A, which is incorporated herein by reference. Referring to FIG. 2, MBE encoder 115 includes a voicing estimator 202, a voicing quantizer 204, a bit prioritizer 206, an encryptor 208, and an error control coder 210.

As described in Section 5.2 of TIA-102.BABA-A, the voicing estimator 202 is responsible for determining whether a particular segment or frame of a speech signal contains voiced or unvoiced sounds. The voicing estimator 202 estimates a voicing status (voiced or unvoiced) for each of $\hat{K}$ voicing bands, and stores them in $\hat{v}_k$ ($1 \le k \le \hat{K}$). The voicing status of a frequency band is "Voiced" when the signal in the frequency band contains predominantly periodic energy. The voicing status of a frequency band is "Unvoiced" when the signal in the frequency band contains predominantly aperiodic (noise-like) energy. The number of voicing bands, $\hat{K}$, is derived from the number of harmonics, $\hat{L}$. The range for $\hat{L}$ is from 9 to 56 harmonics, and thus the range for $\hat{K}$ is from 3 to 12 bands.

After estimating the voicing for each of the $\hat{K}$ voicing bands, the voicing bits are combined by the voicing quantizer 204 to create a $\hat{K}$-bit voicing vector named $\hat{b}_1$. The voicing quantizer 204 takes the continuous voicing estimation provided by the voicing estimator 202 and converts it into a binary decision: either "voiced" or "unvoiced."

The voicing bits of $\hat{b}_1$, along with the other quantized model parameters in $\hat{b}_0$ through $\hat{b}_{\hat{L}+2}$, pass through the bit prioritizer 206, the (optional) encryptor 208, and the error control coder 210. TIA-102_BABA-A Section 6.2 and FIG. 15 of TIA-102_BABA-A provide further information on how the quantized voicing bits, $\hat{b}_1$, are constructed. $\hat{b}_0$ contains quantized fundamental frequency bits (described in TIA-102_BABA-A Section 6.1 and FIG. 14 of TIA-102_BABA-A). $\hat{b}_2$ through $\hat{b}_{\hat{L}+1}$ (inclusive) contain the quantized spectral amplitudes (described in TIA-102_BABA-A Section 6.3 and FIG. 15 of TIA-102_BABA-A). $\hat{b}_{\hat{L}+2}$ contains an alternating synchronization bit as described in section 6.5 of TIA-102_BABA-A.

The bit prioritizer 206 performs bit prioritization on the produced voice, silence, or data frame to prioritize the most important bits in the frame for transmission or storage. The frame is divided into several groups of bits, with each group assigned a priority level based on its importance. Different encoding techniques may be applied to different groups, depending on their priority levels. The (optional) encryptor 208 is a device, software program, or component of a system that is responsible for encrypting data. Encryption is a process of converting plaintext (unencrypted) data into ciphertext (encrypted) data using a cryptographic algorithm and a secret key. The error control coder 210, also referred to as an FEC encoder, performs FEC encoding to add redundancy to the frame in order to facilitate error correction within a subsequent FEC decoder. After FEC encoding, the voicing bits are ready for transmission.

After passing through a transmission channel 212, the voicing bits enter MBE decoder 145. The MBE decoder 145 includes an error control decoder 214, a decryptor 216, a reverse bit prioritizer 218, a voicing smoother 220, and a voicing decoder 222.

The error control decoder 214, also referred to as an FEC decoder, detects and corrects bit errors in the received voicing bits. The voicing bits output by the error control decoder 214 may pass through the decryptor 216 (which is optional) before they enter the reverse bit prioritizer 218. The vectors $\tilde{b}_0$ through $\tilde{b}_{\tilde{L}+2}$ output from the reverse bit prioritizer 218 contain the received, quantized model parameters. In the absence of errors in the transmission channel 212, the quantized parameters that are received by the MBE decoder 145 are identical to those that were generated by the MBE encoder 115.

The decryptor 216 reverses the process of encryption. It is used to convert encrypted data or ciphertext back into plaintext. The reverse bit prioritizer 218 allocates bits based on priority levels. In some implementations, the inputs to voicing smoother 220 include: $\tilde{b}_1$, which contains the received voicing bits for the current frame;

$$\tilde{b}_1^{(-1)},$$

which contains the received voicing bits for the prior frame; and $C_4$, which contains a voicing confidence measure computed in the error control decoder 214 (e.g., FEC decoder). The error control decoder 214 computes $C_4$ when the error control decoder 214 decodes the first hamming code. $C_4$ is a difference in hamming distance between the best hamming decode candidate and the second-best hamming decode candidate. A basic property of hamming codes is that all codewords have a hard-decision distance of at least 3 from any other codeword. This means that the hard-decision distance (between the best hamming decode candidate and the second-best hamming decode candidate) will be greater than or equal to 3 for perfect channel conditions. The voicing bits are predominately contained in the first hamming code, although when $\tilde{K}$=12, the first bit of the second hamming code also contains a single voicing bit. Despite this exception, $C_4$ is derived only from the first hamming code. $C_4$ is described in the patent application Ser. No. 18/482,350, filed on Oct. 6, 2023, entitled "BIT ERROR CORRECTION IN DIGITAL SPEECH", which is incorporated herein by reference.

The presence of uncorrected bit errors in $\tilde{b}_1$ may result in audible voice artifacts that affect intelligibility. The output of the voicing smoother 220 is a "smoothed" variant of $\tilde{b}_1$ that eliminates or reduces voicing artifacts that negatively affect voice quality and/or intelligibility.

The voicing decoder 222 converts the voicing decisions (voiced/unvoiced decisions) for each frequency band represented by the $\tilde{K}$-bit voicing vector $\tilde{b}_1$ into a voicing decision for each harmonic $\tilde{v}_l$, 1≤l≤$\tilde{L}$.

Figure 3:
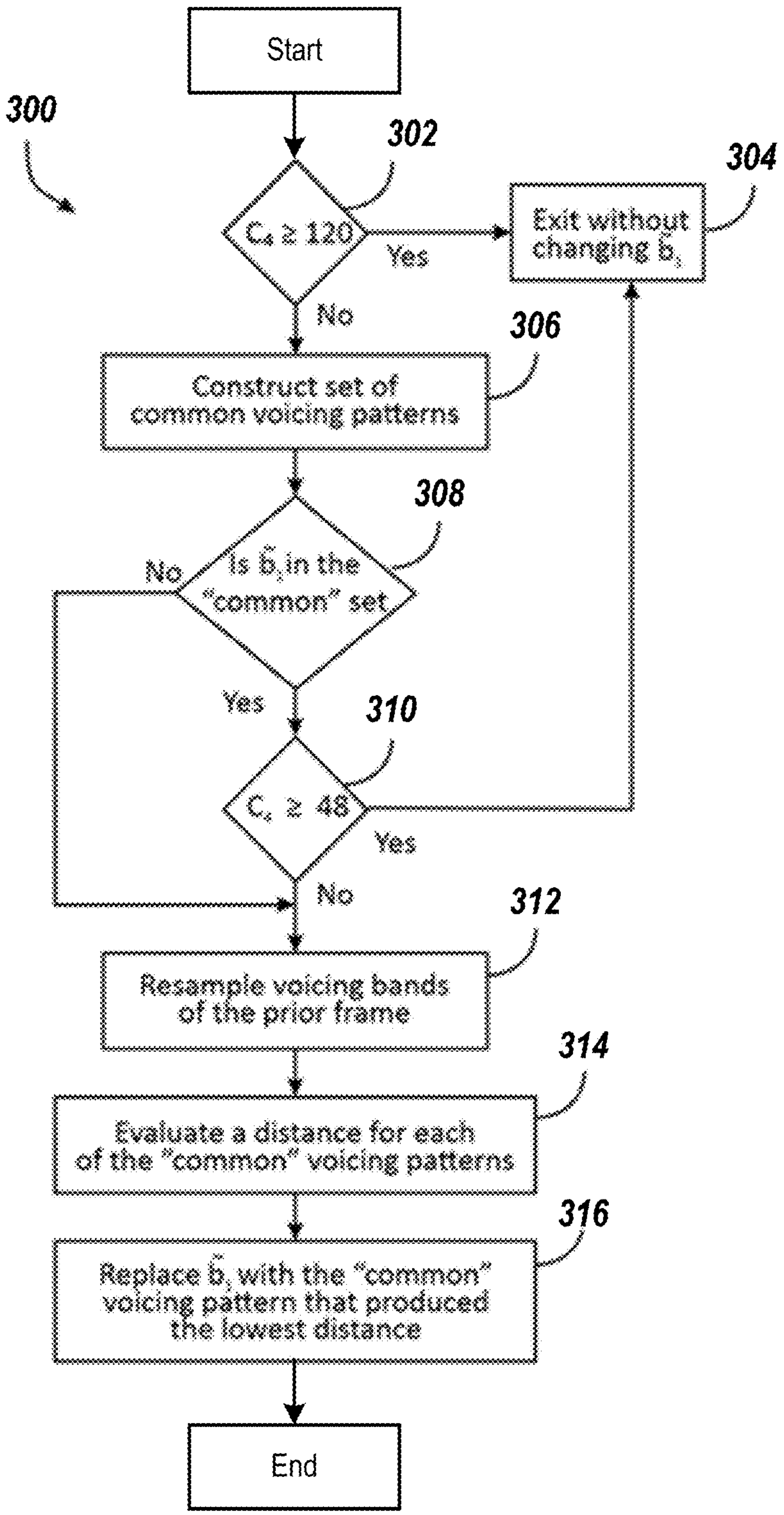
FIG. 3 is a flow chart of a Voiced/Unvoiced Decision smoothing (V/UV smoothing) process.

Referring to FIG. 3, a voicing smoother (e.g., the voicing smoother 220 of FIG. 2) operates according to a process 300. The inputs to the voicing smoother 220 include the error-corrected voicing bits $\tilde{b}_1$ of the current frame, the error-corrected voicing bits $$\tilde{b}_1^{(-1)}$$

of the prior frame, the error-corrected fundamental frequency bits $\tilde{b}_0$, and voicing confidence measures $C_4$ and $$C_4^{(-1)}$$

for the current and prior frames.

The error control decoder 214 generates $\tilde{b}_1$ and $\tilde{b}_0$ and the voicing confidence measure when the first hamming code is decoded.

The voicing smoother uses the voicing confidence measure $C_4$ to indicate a degree of reliability of the decoded voicing bits. The P25 Full Rate voicing bits are contained predominately within the first hamming code. Therefore, the voicing confidence measure $C_4$ can be computed while decoding the first hamming code. When the voicing confidence measure $C_4$ is low, it is expected that errors in the voicing bits are more likely to occur than when the voicing confidence measure $C_4$ is high. In the absence of bit errors, the received hamming code would have a minimum hard-decision distance of 0 from the received codeword. The hard-decision distance between the received codeword and any other codeword is at least 3. In the presence of bit errors, the hamming distance between a received codeword and the transmitted codeword can be between 0 and 3, and it is possible that two candidate codewords will tie. The voicing confidence measure $C_4$ is a measure of the difference between the minimum hamming distance and the second minimum hamming distance. As to hard-decision, in the absence of bit errors, the difference between the minimum hamming distance and the second minimum hamming distance is at least 3. Soft-decision adds more resolution to the hamming distance measurements. More bit errors can make the confidence measure fall as low as zero, indicating that there are two different codewords that have the same hamming distance to the received codeword. As the voicing confidence approaches zero, there is a higher probability that the decoded $\tilde{b}_1$ contains voicing errors.

The details on computing the minimum hamming distance are discussed in the U.S. patent application Ser. No. 18/482,350, filed on Oct. 6, 2023, entitled "Bit Error Correction in Digital Speech."

$d_{4,k,n}$ is computed according to Equation 1 (referred to as Equation 16 of U.S. patent application Ser. No. 18/482,350, filed on Oct. 6, 2023, entitled "Bit Error Correction in Digital Speech"):

$$d_{4,k,n} = \left|v^{4,n} - (2^B - 1)\cdot t^{11,k}\cdot H^{15,11}\right|\cdot s^{15} \text{ for } 0 \le k < 2048,\ 0 \le n < N_c \quad (1)$$

$t^{11,k}$ is an 11-bit row vector containing all ones and zeros. It represents 2048 possible Hamming code vectors that could have been transmitted from an encoder.

$$H^{15,11} = \begin{bmatrix} 1&0&0&0&0&0&0&0&0&0&0&1&1&1&1 \\ 0&1&0&0&0&0&0&0&0&0&0&1&1&1&0 \\ 0&0&1&0&0&0&0&0&0&0&0&1&1&0&1 \\ 0&0&0&1&0&0&0&0&0&0&0&1&1&0&0 \\ 0&0&0&0&1&0&0&0&0&0&0&1&0&1&1 \\ 0&0&0&0&0&1&0&0&0&0&0&1&0&1&0 \\ 0&0&0&0&0&0&1&0&0&0&0&1&0&0&1 \\ 0&0&0&0&0&0&0&1&0&0&0&0&1&1&1 \\ 0&0&0&0&0&0&0&0&1&0&0&0&1&1&0 \\ 0&0&0&0&0&0&0&0&0&1&0&0&1&0&1 \\ 0&0&0&0&0&0&0&0&0&0&1&0&0&1&1 \end{bmatrix}$$

$s^{15}$ is a column vector of length 15, containing all ones.

$D_{4,n}$, which is the minimum hamming distance over all k for each value of n, is computed according to Equation 2:

$$D_{4,n} = \min_k d_{4,k,n} \text{ for } 0 \le n < N_c \tag{2}$$

A second minimum hamming distance $\dot{D}_{4,n}$ for each value of n is also computed.

A value of n, $n_{min}$, which produces the minimum total hamming distance across all seven of the code words, is selected according to Equation 3:

$$D = \min_n D_{T,n} \tag{3}$$

The voicing confidence measure is computed according to Equation 4:

$$C_4 = \frac{128(\dot{D}_{4,n_{min}} - D_{4,n_{min}})}{2^B} \tag{4}$$

In Equation 4, B is the number of soft decision bits in the input bitstream to the MBE Decoder 145. Division by $2^B$ normalizes the voicing confidence measure $C_4$, such that it has a scale that is independent of B. As to hard decision, B=1. In the absence of bit errors, the minimum hard-decision hamming distance between the best candidate and the second-best candidate is 3, due to hamming code properties.

$$C_4 = \frac{128 \cdot 3}{2^1} = 192$$

is the best possible voicing confidence measure regardless of B. $C_4=192$ indicates very high confidence that the FEC decoded voicing bits are correct, whereas $C_4=0$ indicates very little confidence that the FEC decoded voicing bits are correct. In some implementations, there may be other approaches for computing a suitable voicing confidence measure $C_4$ for input to the voicing smoother.

At step 302, the voicing smoother determines whether the voicing confidence measure $C_4$ is above a threshold. For example, if $C_4 \ge 120$, the voicing smoother determines that the threshold has been exceeded and that no V/UV smoothing is needed, and at step 304, the process 300 ends without making any change to the voicing bits in $\tilde{b}_1$.

At step 306, the voicing smoother generates a set of "common" voicing patterns for the current frame that has $\tilde{K}$ voicing bands. The voicing bits in $\tilde{b}_1$ represent a voicing state of each of $\tilde{K}$ voicing bands. There are $2^{\tilde{K}}$ distinct voicing patterns that can be received by the MBE decoder 145. However, in practice, most of the patterns rarely occur. The voicing bits contained in $\tilde{b}_1$ represent one of $2^{\tilde{K}}$ possible voicing patterns. The set of "common" voicing patterns is a subset of $2^{\tilde{K}}$ possible voicing patterns, and the "common" set includes $\tilde{K}+1$ voicing patterns. The set of common voicing patterns is dependent upon the number of voicing bands. For example, if two frames have the same number of voicing bands, the same set of "common" voicing patterns is constructed for the two frames. The voicing patterns within the "common" set occur most frequently in typical voice, and therefore are the most probable voicing patterns that the MBE decoder 145 receives. As to typical speech, over 98% of the frames have a voicing pattern that belongs to the "common" set of voicing patterns. The "common" set of voicing patterns is denoted as $c_i$, $0 \le i \le \tilde{K}$. Each member $c_i$ is a $\tilde{K}$-bit vector, corresponding to $\tilde{K}$ binary voicing bands, where a "1" represents a voiced band and a "0" represents an unvoiced band.

The set of common voicing patterns is defined as the following set of $\tilde{K}+1$ voicing patterns: $\{c_0, \ldots, c_{\tilde{K}}\}$, where $$c_i = \sum_{k=1}^{i+1} 2^{\tilde{K}-k} \quad 0 \le i < \tilde{K}$$

$$C_{\tilde{K}} = 0$$

The set of common voicing patterns represents voicing patterns that are entirely voiced, entirely unvoiced, voiced below a cutoff frequency, or unvoiced above the cutoff frequency. For example, if $\tilde{K}=5$, the set of common voicing patterns, where the voicing patterns are expressed in binary, includes {10000, 11000, 11100, 11110, 11111, 00000}. 10000 indicates that the lowest frequency band is voiced and the four higher frequency bands are unvoiced. 11000 indicates the lowest two frequency bands are voiced and the highest three frequency bands are unvoiced.

At step 308, the voicing smoother compares $\tilde{b}_1$ to every voicing pattern in the "common" set to determine whether $\tilde{b}_1$ matches a "common" voicing pattern. If $\tilde{b}_1$ matches any voicing pattern in the "common" set, and the voicing smoother determines at step 310 that the voicing confidence measure $C_4$ exceeds a threshold (e.g., 48), the voicing smoother determines that no V/UV smoothing is needed, and the process 300 ends at step 304 without making any change to the voicing bits in $\tilde{b}_1$. Otherwise, if either $\tilde{b}_1$ fails to match any voicing pattern in the "common" set, or if the voicing smoother determines at step 310 that the voicing confidence measure $C_4$ is less than the threshold (e.g., 48), the process 300 continues.

At step 312, the voicing smoother resamples the voicing bands $$\tilde{b}_1^{(-1)}$$

of the prior frame to produce voicing bits for the voicing bands. The voicing smoother can use the voicing bits $$\tilde{b}_1^{(-1)}$$

of the prior frame to smooth the voicing bits of the current frame. If the number $\tilde{K}^{(-1)}$ of voicing bands in the prior frame is not the same as the number $\tilde{K}$ of voicing bands in the current frame, the voicing bands in $$\tilde{b}_1^{(-1)}$$

are resampled. The resampled voicing bands of the prior frame $\dot{b}_1$ can be used to select a voicing pattern from the set of "common" voicing patterns.

The voicing decisions for voicing harmonics of the prior frame are generated according to Equations 5 and 6:

$$\kappa_l^{(-1)} = \begin{cases} \left\lfloor \frac{l+2}{3} \right\rfloor & \text{if } l \le 36 \\ 12 & \text{otherwise} \end{cases} \tag{5}$$

$$\tilde{v}_l^{(-1)} = \left\lfloor \frac{\tilde{b}_1^{(-1)}}{2^{\tilde{K}-\kappa_l^{(-1)}}} \right\rfloor - 2\left\lfloor \frac{\tilde{b}_1^{(-1)}}{2^{\tilde{K}+1-\kappa_l^{(-1)}}} \right\rfloor \quad \text{for } 1 \le l \le \tilde{L}^{(-1)} \tag{6}$$

The voicing harmonics of the prior frame are then resampled according to Equation 7, such that the prior frame has the same number of voicing harmonics as that of the current frame.

$$\dot{v}_l = \tilde{v}_{l\frac{\tilde{L}^{(-1)}}{\tilde{L}}} \quad \text{for } 1 \le l \le \tilde{L} \tag{7}$$

The harmonic voicing decisions, $\dot{v}_l$, $1 \le l \le \tilde{L}$, are then converted to a voicing decision for each voicing band, $\dot{v}_k$, $1 \le k \le \tilde{K}$, according to Equation 8 below, which designates a band as a voiced band if half or more of the harmonics in the voicing band are voiced.

$$\dot{v}_k = \begin{cases} 1 & \text{if } \left\lfloor \frac{w_k}{2} \right\rfloor < \sum_{l=1+3(k-1)}^{3(k-1)+w_k} \dot{v}_l \\ 0 & \text{otherwise} \end{cases} \tag{8}$$

Where $w_k$ for $1 \le k \le \tilde{K}$ is a width in harmonics of each voicing band:

$$w_k = \begin{cases} 3 & \text{if } k < \tilde{K} \\ \tilde{L} - \sum_{k=1}^{\tilde{K}-1} w_k & \text{if } k = \tilde{K} \end{cases}$$

The voicing bands in $\dot{v}_k$ are combined to create $\dot{b}_1$, according to Equation 9:

$$\dot{b}_1 = \sum_{k=1}^{\tilde{K}} \dot{v}_k 2^{\tilde{K}-k} \tag{9}$$

$\dot{b}_1$ contains the same number of voicing bands as that of $\tilde{b}_1$. The voicing state of each voicing band in $\dot{b}_1$ is derived from the prior frame rather than the current frame.

At step 314, the voicing smoother evaluates or calculates a hamming distance for each member in the "common" set of voicing patterns $c_i$, $0 \le i \le \tilde{K}$. The hamming distance is a weighted combination of the hamming distance between $c_i$ and $\tilde{b}_1$ and the hamming distance between $c_i$ and $\dot{b}_1$. Since $c_i$, $\tilde{b}_1$, and $\dot{b}_1$ are all $\tilde{K}$-bit binary vectors, the hamming distance between them indicates the number of voicing bands that are different.

Both $\tilde{b}_1$ and $\dot{b}_1$ are checked to see how closely they match each member $c_i$, $0 \le i < \tilde{K}$ in the set of common voicing patterns. Each of $\tilde{b}_1$, $\dot{b}_1$, and $c_i$ are $\tilde{K}$-bit vectors. Each $c_i$ in the set of common voicing patterns is considered as a candidate for replacing the received voicing bits contained in $\tilde{b}_1$. The expression dist($\tilde{b}_1$, $c_i$) is the hamming distance between $\tilde{b}_1$ and $c_i$, which is equal to the total number of different voicing bands between $\tilde{b}_1$ and $c_i$. Similarly, the expression dist($\dot{b}_1$, $c_i$) is the hamming distance between $\dot{b}_1$ and $c_i$, which is equal to the total number of different voicing bands between $\dot{b}_1$ and $c_i$. To compute a total hamming distance representing a combination of the hamming distances between each $c_i$ and both of $\tilde{b}_1$ and $\dot{b}_1$, the weights $s_C$ and $s_L$ are computed according to Equations 10 and 11 below.

$$s_C = \begin{cases} 2 & \text{if } C_4^{(-1)} > C_4 \\ 1 & \text{otherwise} \end{cases} \tag{10}$$

$$s_L = \begin{cases} 1 & C_4^{(-1)} > C_4 \\ 0 & \text{otherwise} \end{cases} \tag{11}$$

Where $s_C$ is a weight for the current frame and $s_L$ is a weight for the prior frame.

$$d_{C,i} = dist(\tilde{b}_1, c_i) \text{ for } 0 \le i \le \tilde{K}$$

$$d_{L,i} = dist(\dot{b}_1, c_i) \text{ for } 0 \le i \le \tilde{K}$$

$$d_{T,i} = s_C d_{C,i} + s_L d_{L,i} \text{ for } 0 \le i < \tilde{K}$$

$$d_{T,i} = s_C d_{C,i} + s_L d_{L,i} + a \text{ when } i = \tilde{K}$$

where a is an adjustment that favors selecting the voicing candidate $c_i$=0, when the received fundamental frequency parameter $\tilde{b}_0$ is 6. This is because the MBE encoder 115 transmits $\hat{b}_0$=6, when it transmits $\hat{b}_1$=0. That is when the MBE encoder 115 produces a frame that has every voicing band unvoiced and the fundamental frequency is fixed.

$$a = \begin{cases} -1 & \text{if } \tilde{b}_0 = 6 \text{ and } \left(\left(4 \cdot dist(\tilde{b}_1, 0) \le \tilde{K}\right) \text{ or } (C_4 < 24)\right) \text{ and } C_4^{(-1)} \le C_4 \\ -2 & \text{if } \tilde{b}_0 = 6 \text{ and } \left(\left(4 \cdot dist(\tilde{b}_1, 0) \le \tilde{K}\right) \text{ or } (C_4 < 24)\right) \text{ and } C_4^{(-1)} > C_4 \\ 2 & \text{if } \tilde{b}_0 \ne 6 \\ 0 & \text{otherwise} \end{cases}$$

At step 316, the voicing pattern having the minimum hamming distance is selected from the "common" set and $\tilde{b}_1$ is replaced with the selected voicing pattern.

After computing the total hamming distances $d_{T,i}$, $0 \le i \le \tilde{K}$ for each candidate $c_i$, $0 \le i \le \tilde{K}$, $\tilde{b}_1$ is replaced by the candidate $c_{min}$ that produced the minimum total hamming distance $d_{min}$, according to Equation 12 below.

$$\tilde{b}_1 = c_{min} \tag{12}$$

Figure 4:
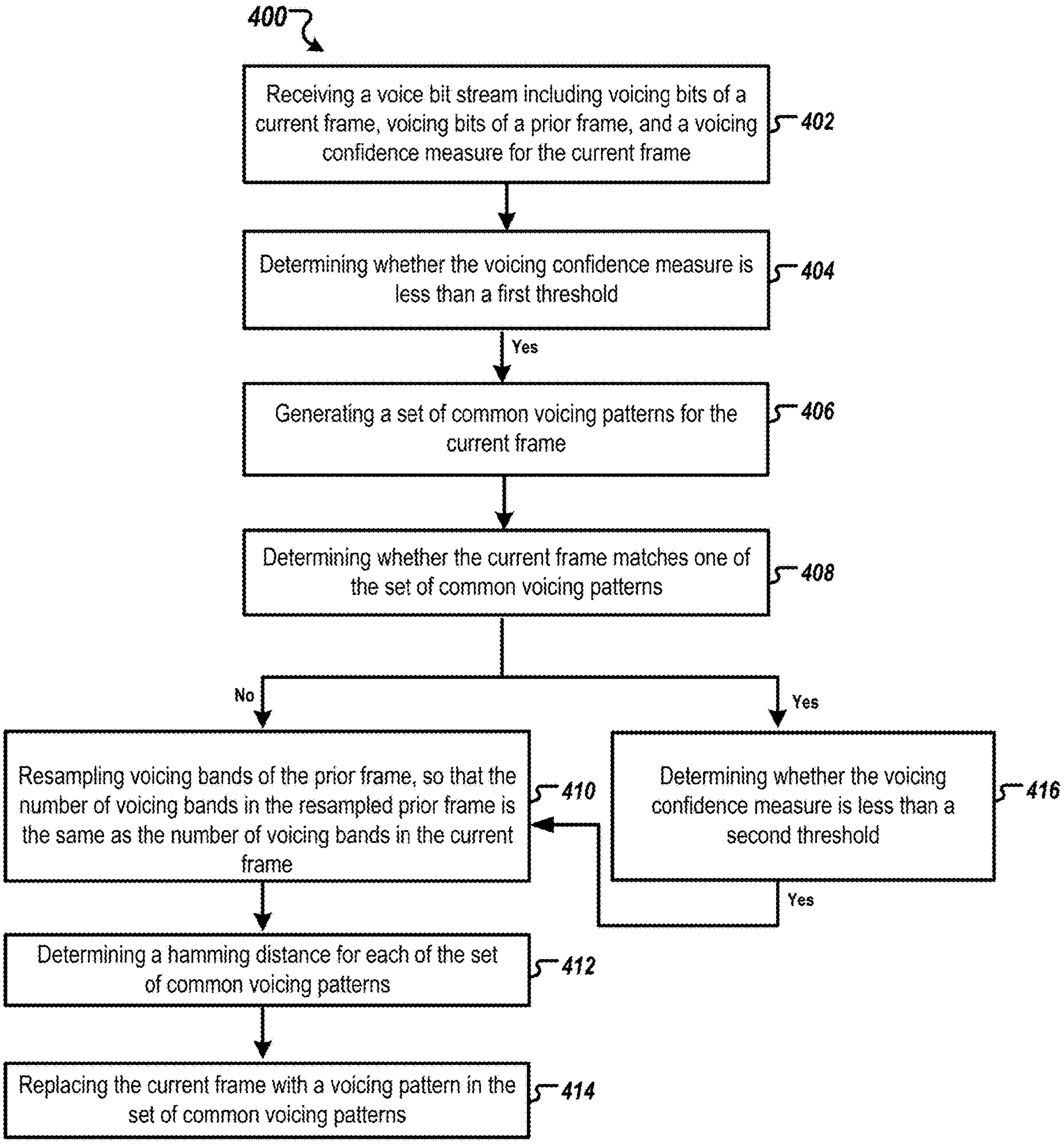
FIG. 4 is a flow chart of another V/UV smoothing process.

FIG. 4 is a flow chart of another V/UV smoothing process 400. The process 400 can be implemented by a voicing smoother (e.g., voicing smoother 220 of FIG. 2) included in an MBE decoder (e.g., MBE decoder 145 of FIGS. 1 and 2).

At step 402, the voicing smoother receives a voice bit stream including voicing bits $\tilde{b}_1$ of a current frame, voicing bits $$\tilde{b}_1^{(-1)}$$

of a prior frame, and a voicing confidence measure $C_4$ for the current frame.

At step 404, the voicing smoother determines whether the voicing confidence measure $C_4$ is less than a first threshold, e.g., 120.

At step 406, in response to determining that the voicing confidence measure is less than a first threshold, the voicing smoother generates a set of common voicing patterns $c_i$, $0 \le i \le \tilde{K}$ for the current frame. Otherwise, in response to determining that the voicing confidence measure is more than or equal to the first threshold, the voicing smoother exits the process 400.

At step 408, the voicing smoother determines whether the current frame matches a voicing pattern in the set of common voicing patterns.

At step 410, in response to the current frame failing to match any voicing pattern in the set of common voicing patterns, the voicing smoother resamples voicing bands of the prior frame, so that the number of voicing bands in the resampled prior frame is the same as the number $\tilde{K}$ of voicing bands in the current frame. At step 412, the voicing smoother determines or calculates a hamming distance for each of the set of common voicing patterns with respect to the current frame and the prior frame. At step 414, the voicing smoother replaces the current frame with a voicing pattern in the set of common voicing patterns that has the minimum hamming distance.

At step 416, in response to the current frame matching a voicing pattern in the set of common voicing patterns, the voicing smoother determines whether the voicing confidence measure $C_4$ is less than a second threshold, e.g., 48. If the voicing confidence measure $C_4$ is less than the second threshold, the voicing smoother performs steps 410, 412, and 414. Otherwise, the voicing smoother exits the process 400.

The voicing smoother may be implemented in a speech decoder. The speech decoder may be included in, for example, a handset, a mobile radio, a base station, a console, a vehicle, or an aircraft. The voicing smoother can be used in any P25 full-rate decoder. The voicing smoother produces significant voice quality improvements with little computational complexity.

While the techniques are described largely in the context of an MBE Project 25 full-rate vocoder, the described techniques may be readily applied to other systems and/or vocoders. For example, DMR vocoders may also benefit from the techniques regardless of the bit rate or frame size. In addition, the techniques described may be applicable to many other speech coding systems that use a different speech model with alternative parameters (such as Sub-band Adaptive Transform Coding (STC), Mixed Excitation Linear Prediction (MELP), Multiband Harmonic Transform Coder (MB-HTC), (Code Excited Linear Prediction) CELP, Harmonic Vector Excitation Coding (HVXC) or others).

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

I claim:

1. A method of correcting errors in a digital speech signal, the method comprising:
- receiving a voice bit stream;
- generating, from the received voice bit stream, voicing bits of a current frame, voicing bits of a prior frame, and a voicing confidence measure for the current frame;
- determining whether the voicing confidence measure is less than a first threshold;
- in response to determining that the voicing confidence measure is less than the first threshold:
  - generating a set of common voicing patterns;
  - determining whether the current frame matches a voicing pattern in the set of common voicing patterns; and
  - in response to the current frame failing to match any voicing pattern in the set of common voicing patterns:
    - resampling voicing bands of the prior frame, so that a number of voicing bands in the resampled prior frame is the same as a number of voicing bands in the current frame;
    - determining a distance for each of the set of common voicing patterns with respect to the current frame and the prior frame; and
    - replacing the current frame with a particular voicing pattern in the set of common voicing patterns that has a smallest determined distance.

2. The method of claim 1, further comprising:
- in response to the current frame matching a voicing pattern in the set of common voicing patterns, determining whether the voicing confidence measure is less than a second threshold that is less than the first threshold.

3. The method of claim 1, wherein the set of common voicing patterns comprises $\{c_0, \ldots, c_{\tilde{K}}\}$, $$c_i = \sum_{k=1}^{i+1} 2^{\tilde{K}-k} \quad 0 \le i < \tilde{K}$$

$$c_{\tilde{K}} = 0,$$

where $\tilde{K}$ is the number of voicing bands in the current frame.

4. The method of claim 1, wherein the number of voicing bands in the current frame is $\tilde{K}$, and the number of voicing patterns in the set of common voicing patterns is $\tilde{K}+1$.

5. The method of claim 4, wherein the set of common voicing patterns is a subset of $2^{\tilde{K}}$ possible voicing patterns.

6. The method of claim 1, wherein resampling the voicing bands of the prior frame further comprises:
- generating a voicing decision for each voicing harmonic of the prior frame;

resampling voicing harmonics of the prior frame, so that a number of voicing harmonics in the prior frame is the same as a number of voicing harmonics in the current frame; and converting the voicing decision for each voicing harmonic of the prior frame to a voicing decision for each voicing band of the prior frame.

7. The method of claim 1, wherein the distance is a hamming distance.

8. The method of claim 7, wherein the hamming distance is a weighted combination of a first hamming distance between each voicing pattern in the set of common voicing patterns and the prior frame and a second hamming distance between each voicing pattern in the set of common voicing patterns and the current frame.

9. The method of claim 1, wherein the voice bit stream is generated by an MBE encoder.

10. A speech decoder configured to perform operations comprising:

receiving a voice bit stream;

generating, from the received voice bit stream, voicing bits of a current frame, voicing bits of a prior frame, and a voicing confidence measure for the current frame;

determining whether the voicing confidence measure is less than a first threshold;

in response to determining that the voicing confidence measure is less than the first threshold, generating a set of common voicing patterns;

determining whether the current frame matches a voicing pattern in the set of common voicing patterns;

in response to the current frame failing to match any voicing pattern in the set of common voicing patterns, resampling voicing bands of the prior frame, so that a number of voicing bands in the resampled prior frame is the same as a number of voicing bands in the current frame;

determining a distance for each of the set of common voicing patterns with respect to the current frame and the prior frame; and replacing the current frame with a particular voicing pattern in the set of common voicing patterns that has a smallest determined distance.

11. The speech decoder of claim 10, the operations further comprising:

in response to the current frame matching a voicing pattern in the set of common voicing patterns, determining whether the voicing confidence measure is less than a second threshold that is less than the first threshold.

12. The speech decoder of claim 10, wherein the set of common voicing patterns comprises $\{c_0, \ldots, c_{\tilde{K}}\}$, $$c_i = \sum_{k=1}^{i+1} 2^{\tilde{K}-k} \quad 0 \le i < \tilde{K}$$

$$c_{\tilde{K}} = 0,$$

where $\tilde{K}$ is the number of voicing bands in the current frame.

13. The speech decoder of claim 10, wherein the number of voicing bands in the current frame is $\tilde{K}$, and the number of voicing patterns in the set of common voicing patterns is $\tilde{K}+1$.

14. The speech decoder of claim 13, wherein the set of common voicing patterns is a subset of $2^{\tilde{K}}$ possible voicing patterns.

15. The speech decoder of claim 10, wherein resampling the voicing bands of the prior frame further comprises:

generating a voicing decision for each voicing harmonic of the prior frame;

resampling voicing harmonics of the prior frame, so that a number of voicing harmonics in the prior frame is the same as a number of voicing harmonics in the current frame; and converting the voicing decision for each voicing harmonic of the prior frame to a voicing decision for each voicing band of the prior frame.

16. The speech decoder of claim 10, wherein the distance is a hamming distance.

17. The speech decoder of claim 16, wherein the hamming distance is a weighted combination of a first hamming distance between each voicing pattern in the set of common voicing patterns and the prior frame and a second hamming distance between each voicing pattern in the set of common voicing patterns and the current frame.

18. The speech decoder of claim 10, wherein the voice bit stream is generated by an MBE encoder.

19. A handset or mobile radio comprising the speech decoder of claim 10.

20. A base station or console comprising the speech decoder of claim 10.

* * * * *